United States Patent [19]

Ando

[11] Patent Number: 5,706,264
[45] Date of Patent: Jan. 6, 1998

[54] DISC APPARATUS HAVING SERVO CIRCUITS WHICH COMPENSATE FOR FLUCTUATIONS IN POWER SUPPLY

[75] Inventor: Ryo Ando, Tokyo, Japan

[73] Assignee: Sony Corporation, Tokyo, Japan

[21] Appl. No.: 412,171

[22] Filed: Mar. 28, 1995

[30] Foreign Application Priority Data

Mar. 31, 1994 [JP] Japan .................................. 6-083636

[51] Int. Cl.⁶ ..................................................... G11B 7/00
[52] U.S. Cl. ............................................. 369/50; 369/47
[58] Field of Search ............................ 369/50, 47, 48, 369/49, 54, 58, 44.29, 44.31, 44.34, 44.5, 44.28

[56] References Cited

U.S. PATENT DOCUMENTS

| | | | |
|---|---|---|---|
| 3,909,608 | 9/1975 | Le Merer et al. | 250/202 |
| 4,023,033 | 5/1977 | Bricot et al. | 250/201 |
| 4,561,032 | 12/1985 | Matsumoto et al. | 360/114 |
| 4,771,414 | 9/1988 | Yoshimatsu . | |
| 4,817,072 | 3/1989 | Toide et al. | 369/44 |
| 4,820,940 | 4/1989 | Wachi et al. . | |
| 4,942,565 | 7/1990 | Lagadec | 369/59 |
| 4,951,274 | 8/1990 | Iwanaga et al. | 369/44.11 |
| 5,023,854 | 6/1991 | Satoh et al. | 369/32 |
| 5,042,020 | 8/1991 | Endo | 369/44.31 |
| 5,065,380 | 11/1991 | Yokota | 369/44.12 |
| 5,097,458 | 3/1992 | Suzuki | 369/44.29 X |
| 5,105,409 | 4/1992 | Kaku et al. | 369/44.31 |
| 5,138,592 | 8/1992 | Fujita | 369/44.13 |
| 5,161,139 | 11/1992 | Inoue et al. | 369/44.23 |
| 5,257,253 | 10/1993 | Otsubo et al. | 369/48 |
| 5,268,883 | 12/1993 | Yamaguchi et al. | 369/44.29 X |
| 5,268,886 | 12/1993 | Nagashima et al. | 369/44.41 |
| 5,270,996 | 12/1993 | Ono | 369/110 |
| 5,272,693 | 12/1993 | Fujisawa | 369/291 |
| 5,276,665 | 1/1994 | Aoki et al. | 369/58 |
| 5,278,401 | 1/1994 | Takishima et al. | 250/201.5 |
| 5,281,802 | 1/1994 | Kitabayashi | 250/201.5 |
| 5,297,114 | 3/1994 | Itoh et al. | 369/44.32 |
| 5,349,175 | 9/1994 | Prikryl | 250/201.5 |

FOREIGN PATENT DOCUMENTS

| | | | |
|---|---|---|---|
| 0294241 A2 | 12/1988 | European Pat. Off. | G11B 7/013 |
| 0294490 A1 | 12/1988 | European Pat. Off. | G11B 19/12 |
| 0336328 A2 | 10/1989 | European Pat. Off. | G06K 7/14 |
| 0463575 A2 | 1/1992 | European Pat. Off. | G11B 23/03 |
| 2591787 A1 | 12/1985 | France | G11B 7/125 |
| 01241026 | 9/1989 | Japan . | |

OTHER PUBLICATIONS

Patent Abstracts of Japan, vol. 011002, Publ. No. JP 61180935, Publ. Date Aug. 13, 1986, Inv. Mari Kimura et al., "Optical Signal Recording and Reproducing Device".
IBM Technical Disclosure Bulletin, vol. 29, No. 10, Mar. 1987, Armonk, NY, USA, "Optical Disk Read Channel".
Article—"Reflection Polarizing Holographic Optical Element for Compact Magnetooptical Disk Heads," Akitomo Ohba et al., Applied Optics, vol. 29, No. 34, Dec. 1, 1990.

*Primary Examiner*—Muhammad N. Edun
*Attorney, Agent, or Firm*—Limbach & Limbach L.L.P.

[57] ABSTRACT

A servo apparatus for which the servo operation remains stable even if the power supply voltages changes, and the control processing load and amount of control data necessary is reduced by setting up gain variation equipment so as to proceed phase compensators, or setting up gain variation equipment so as to proceed selectors, so that the gain set-up at the time of non-loop operations such as focus searches and track jumps etc. can be varied by the gain variation equipment and the extent of variation of the gain variation equipment can be controlled simultaneously for a number of servo systems.

9 Claims, 7 Drawing Sheets

DISC APPARATUS HAVING SERVO CIRCUITS WHICH COMPENSATE FOR FLUCTUATIONS IN POWER SUPPLY

FIELD OF THE INVENTION

The present invention relates to an optical disc player device suitable for reproducing audio and/or video data recorded on an optical disc, or the like.

BACKGROUND

With disc-based systems such as CD players, video disc players and mini disc (MD) players etc., each of the servo operations for the focusing, tracking, threading and spindling are carried out by digital processes. One example of a such a disc-based system is described in pending U.S. patent application Ser. No. #08/469,808 filed Jun. 6, 1995 which is a continuation of application Ser. No. #08/122,012 (Title: *Recording/Reproducing Apparatus for Disc-Shaped Recording Medium, Photodetector and Optical Head*; Inventor(s): Nobuhiko Ando, et. al.; Filing Date: Sep. 15, 1993; Group Art Unit: 2512; now abandoned). The disclosure of this pending patent application (Ser. No. #08/122,012) is hereby incorporated herein by reference.

For example, phase compensation is carried out after an error signal has been digitized, with the signal resulting from this being pulse wave modulated and applied to a driver element such as, for example, a power MOS etc. The driver element then applies a servo drive current to a motor or actuator in response to the pulse width modulated (PWM) signal.

This kind of digital servo method has benefits such as the reducing of the power consumption.

FIG. 5 is a block view of a conventional digital method servo apparatus installed in a typical CD player.

Here, an optical disc 1 is rotatably driven by a spindle motor 2. An optical head 3 then radiates a light beam onto the disc 1 and the light beam which is reflected back is detected by a detector so that the information recorded on the disc 1 may be read.

At the optical head 3, a two axis actuator mechanism which supports shifting in the tracking and focusing directions is mounted at the objective lens which becomes the light beam output end. This two axis actuator shifts the objective lens across the diameter of the disc in response to the tracking drive current TD applied to the tracking coil, as well as shifting the object lens in a direction towards and away from the disc in response to the focus drive current FD applied to the focus coil.

Numeral 4 indicates a thread motor for shifting the whole of the head 3 across the diameter of the disc 1. The thread motor 4 drives the feed mechanism (send screw) 5 using the applied thread drive current SLD and shifts the optical head 3.

Numeral 6 indicates an RF amplifier. Information detected from the disc 1 by the playback operation of the optical head 3 is sent to this RF amplifier 6. An RF playback signal (EMF signal), tracking error signal TE and focus error signal FE are then extracted by performing operations on the information provided to the RF amplifier 6 and a thread error signal SLE is also obtained by extracting the reduced component of the tracking error signal TE.

The extracted RF playback signal (EMF signal) is D/A converted into an analog audio signal after having undergone EMF modulation and error correction etc., but the details of these kinds of audio playback systems will be omitted from the diagrams and descriptions.

In the servo system, the EMF signal is sent to the EMF synchronization extractor 8 for synchronization detection before being sent to the CLV signal processor 9.

At the CLV signal processor 9, the EMF synchronization signal is injected into the PLL circuit so that a playback bit clock is obtained. A spindle error signal SPE is then generated by comparing this with a reference clock CK.

The spindle error signal SPE is sent to the PW modulator 12 via the A input of the selector 10. A PWM signal having a pulse width which corresponds to the spindle error signal SPE is then outputted at the PW modulator 12 and sent to the spindle driver 28. The spindle driver 28 then generates a spindle drive current SPD in response to the PWM signal and applies this to the spindle motor 2 so that Constant Linear Velocity (CLV) control is exerted on the rotation of the disc 1 by this servo system.

The focus error signal FE obtained from the RF amplifier 6 undergoes phase compensation processing at the phase compensation circuit 14 after having been converted to digital data at the A/D converter 13 and is then sent to the Pulse Width (PW) modulator 17 via input A of the selector 15. The PW modulator 17 then outputs the PWM signal which has a pulse width which corresponds to the output of the phase compensation circuit 14 to the focus driver 29. A focus drive current FD is then generated by the focus driver 29 and is applied to the focus coil at the two axis actuator mechanism within the optical head 3.

The position of the objective lens with respect to the direction towards and away from the disc 1 can therefore be controlled by this servo system and a focus servo operation can be carried out whereby the focal point conditions of the radiated light beam from optical head 3 can be maintained.

Also, the tracking error signal TE obtained from the RF amplifier 6 undergoes phase compensation processing at the phase compensator 19 after having been converted to digital data at the A/D converter 18 and is then sent to the PW modulator 22 via input A of the selector 20. The PW modulator 22 then outputs a PWM signal which has a pulse width corresponding to the output of the phase compensation circuit to the PW modulator 27 via the selector 25 after the PWM signal has been converted to digital data at the A/D converter 23 and phase compensation processing at the phase compensator 24. The PW modulator 27 then outputs the PWM signal which is made to have a pulse width corresponding to the output of the phase compensator 24 to the tracking driver 30. A tracking drive current TD is then generated from the tracking driver 30 and this is supplied to the tracking coil in the two axis actuator mechanism within the optical head 3. The position of the objective lens across the diameter of the disc is controlled using this servo system and the tracking operation is carried out so that the light beam follows the recording track.

The thread error signal SLE is also outputted to the PW modulator 27 via the A input of the selector 25 after being converted to digital data at the A/D converter 23 and having undergone phase compensation processing at the phase compensation circuit 24. The PW modulator 27 outputs the PWM signal made to have a pulse width which corresponds to the output of the phase compensator 24 to the thread driver 31. A thread drive current SLD is then generated from the thread driver 31 and this is applied to the thread motor 4. A thread servo operation is then carried out so that this servo system is used to control the position of the optical head 3 with respect to the diameter of the disc.

Numeral 50 indicates a microcomputer which makes up the controller which can temporarily suspend the aforementioned servo loop operations in the aforementioned four servo systems. Prescribed operations can then be carried out on the motor (spindle motor 2, thread motor 4) and the actuator (tracking coil, focus coil).

This is to say that the selector 10 is changed over to the B input, a spindle kick control signal SK is outputted, this spindle kick control signal SK is inputted to the spindle servo system and the starting/breaking of the rotation of the spindle motor 2 is carried out.

Also, the selector 15 is changed over to the B input and a focus search control signal FS is outputted. The focus search control signal FS is then input to the focus servo system and the focus search operation at the time of playback start-up or after a track access etc. is carried out.

The selector B is also changed over to the B input and a track jump control signal TJ is outputted. The track jump control signal TJ is injected into the servo system and the track jump operation is carried out.

Further, the selector 25 is changed over to the B input and the thread move control signal SM is outputted. The thread move control signal SM is then injected into the thread servo system and the thread shifting operation at the time of access etc. is carried out.

However, in a large number of cases, the batteries etc. used as the power supplies for operations in equipment such as CD players etc. are unstable.

Taking into consideration the PWM servo for the aforementioned kind of digital method, even if the PWM output which is taken as the pulse duty does not change, the driving force which depends on the driver (28–31) changes if the power supply voltage changes. The servo loop gain will therefore also change as a result.

If the servo loop gain varies as a result of the power supply voltage conditions, this means that a stabilized servo operation is not obtained. It is therefore possible that the tracking and focusing may go out more often.

For this reason, in servo apparatus using this kind of conventional structure, a controller 50 controls the phase compensators 14, 19 and 24. Each loop gain can therefore be variably set up.

The controller 50 takes a digital value for the operating power supply voltage Vcc which comes from the power supply 60 from the A/D converter 52 and observes this power supply voltage value. A prescribed gain set-up coefficient is obtained in response to this power supply voltage by referring to the internal ROM table 51 and this is then sent to the phase compensators 14, 19 and 24. Gain setting coefficients for the focus servo system, tracking servo system and thread servo system corresponding to each value of power supply voltage value are stored in the ROM table 51.

By using this kind of control, the servo gain may be kept constant even if there is a certain degree of fluctuation in the power supply voltage Vcc so that the servo operation may be stabilized.

However, in order to carry out this kind of control, a huge amount of table data has to be stored as the ROM table 51. There is also a marked increase in the processing load placed on the CPU of the controller 50 as a result of controlling the focus servo system, tracking servo system and the thread servo system individually.

Also, the driving power with respect to each of the focus search, track jump, thread moving and spindle kick operations fluctuates as a result of changes in the operating power supply voltage Vcc. The controller 50 therefore has to adjust the values for the outputted focus search control signal FS, track jump control signal TJ, thread move control signal SM and spindle kick control signal SK in response the power supply voltage value. This dramatically increases the processing load.

Further, carrying out gain adjustment using phase compensation (compensation filtering) is by no means a simple adjustment method as saturation and maintenance of bit precision have to be taken into account in the internal signal processing steps.

SUMMARY OF THE INVENTION

As it is the object of the present invention to resolve the aforementioned problems, its object is to keep the servo gain fixed even if there are changes in the power supply voltage. Further it is an object to keep the servo operation stable and to reduce the resulting control processing load as well as to reduce the amount of control data necessary.

As a brief overview, a controller monitors the power supply level Vcc and based upon the power supply level, causes coefficient data associated with a predetermined range of power supply levels, to be read from a data table stored in memory and supplied to a multiplication circuit. This multiplication circuit then multiplies an input signal to the multiplication circuit by the specified coefficient and outputs the multiplied signal to additional processing circuitry to generate a drive signal to drive the servo. In the present invention the input signal to the multiplication circuit is a servo error signal.

As an example, where the maximum or optimum power supply voltage is, for example, +1.0 volt, a coefficient (k) of, for example, 1.0 could be assigned/associated with the power supply voltage level and stored in memory. Then when the controller has determined that the power supply voltage is +1.0 voltage the coefficient data 1.0 is read from memory and output to the multiplier circuitry. As a result the input signal to the multiplier circuit (in the present invention, a servo error signal) is multiplied by 1.0. In this case essentially no change in the input servo error signal would take place. Other coefficient values could be assigned/associated with other power supply voltage values and stored in memory. As another example, a coefficient (k) of 2.0 might be assigned/associated with a power supply voltage of +0.5 volts (½ the maximum or optimum voltage supply level). When the power supply voltage falls to, for example, +0.5 volts the coefficient data of 2.0 would be read from memory and output to the multiplier circuit. As a result, the servo error signal would be multiplied by 2.0, or increased by 2.0. A servo drive signal would then be generated based upon the multiplied servo error signal.

The present invention comprises phase compensation circuitry for carrying out phase compensation on a digital data-dependent servo error signal, Pulse Width Modulator (PWM means) for outputting a PWM (Pulse Width Modulation) signal based on a signal output from the phase compensation circuitry, a driver for outputting a servo drive signal in response to the Pulse Width modulator output, and gain variation means for varying servo gain in accordance with a power supply voltage. Here, the gain variation means is subsequent to the phase compensation means.

This servo apparatus may also incorporate a selector for selectively sending the phase compensation circuitry output and a drive control signal to the pulse width modulator, whereby the gain variation means is subsequent to the selector means.

Also, a servo apparatus with a plurality of servo systems may comprise phase compensation means for carrying out phase compensation on a digital data-dependent servo error signal, PWM means for outputting a PWM signal based on a phase compensation means output, driver means for outputting a servo drive signal in response to the PWM means output and gain variation means for varying servo gain in accordance with a power supply voltage. Here, the extent of variation is controlled to be the same for each gain variation means in each servo system.

In this case, the gain variation means is subsequent to the phase compensation means in each servo system.

Also, each system may further comprise selector means for selectively sending the phase compensation means output and a drive control signal to the PWM means, whereby the gain variation means is subsequent to the selector means in each system.

Setting up the clock frequency variation area for the multiplier and the PWM processor etc. which make up the gain variation means so as to be subsequent to the phase compensation means results in the servo gain being easier to adjust. Also, by suceeding the selector means, the gain setting at the time of non-loop operations such as focus searching and track jumping etc. can be varied using the gain variation means.

Further, if the extent of the variation of the gain variation means for each servo system is controlled to be the same so that fluctuations in the servo gain due to variations in the respective power supply voltages in a number of servo systems is the same, the processing load on the microcomputer etc. and the amount of control data required may be reduced.

DETAILED DESCRIPTION OF THE INVENTION

The following is a description using FIG. 1 to FIG. 4 of first to fourth embodiments of this invention. Portions which have the same functions a portions described previously for the case in FIG. 5 will be given the same numerals and their descriptions will be omitted.

Figure 1:
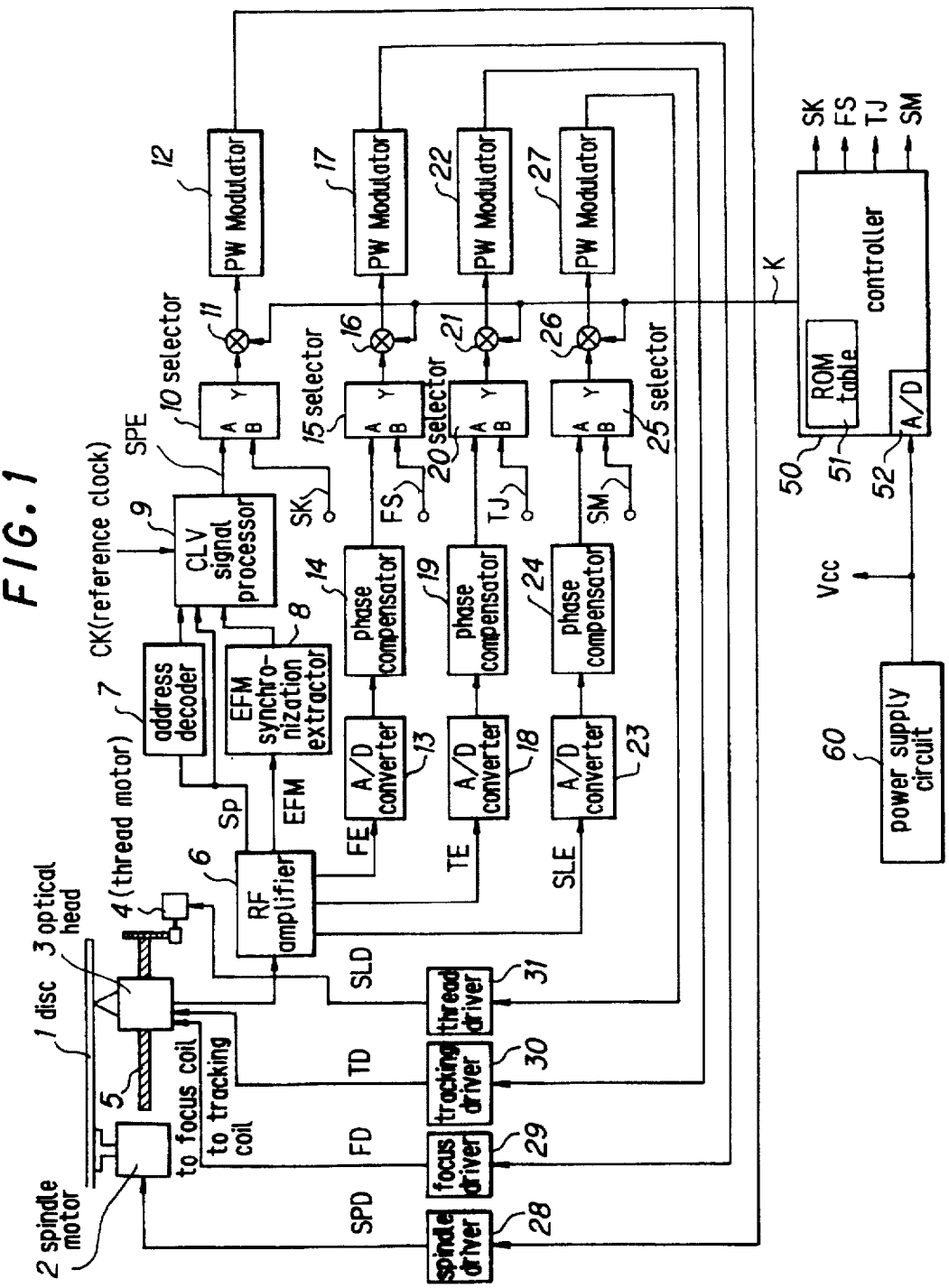
FIG. 1 is a block diagram of a servo apparatus for a first embodiment of this invention.

FIG. 1 shows a servo apparatus incorporated into, for example, a mini-disc (MD) player as one embodiment of the present invention.

Figure 5:
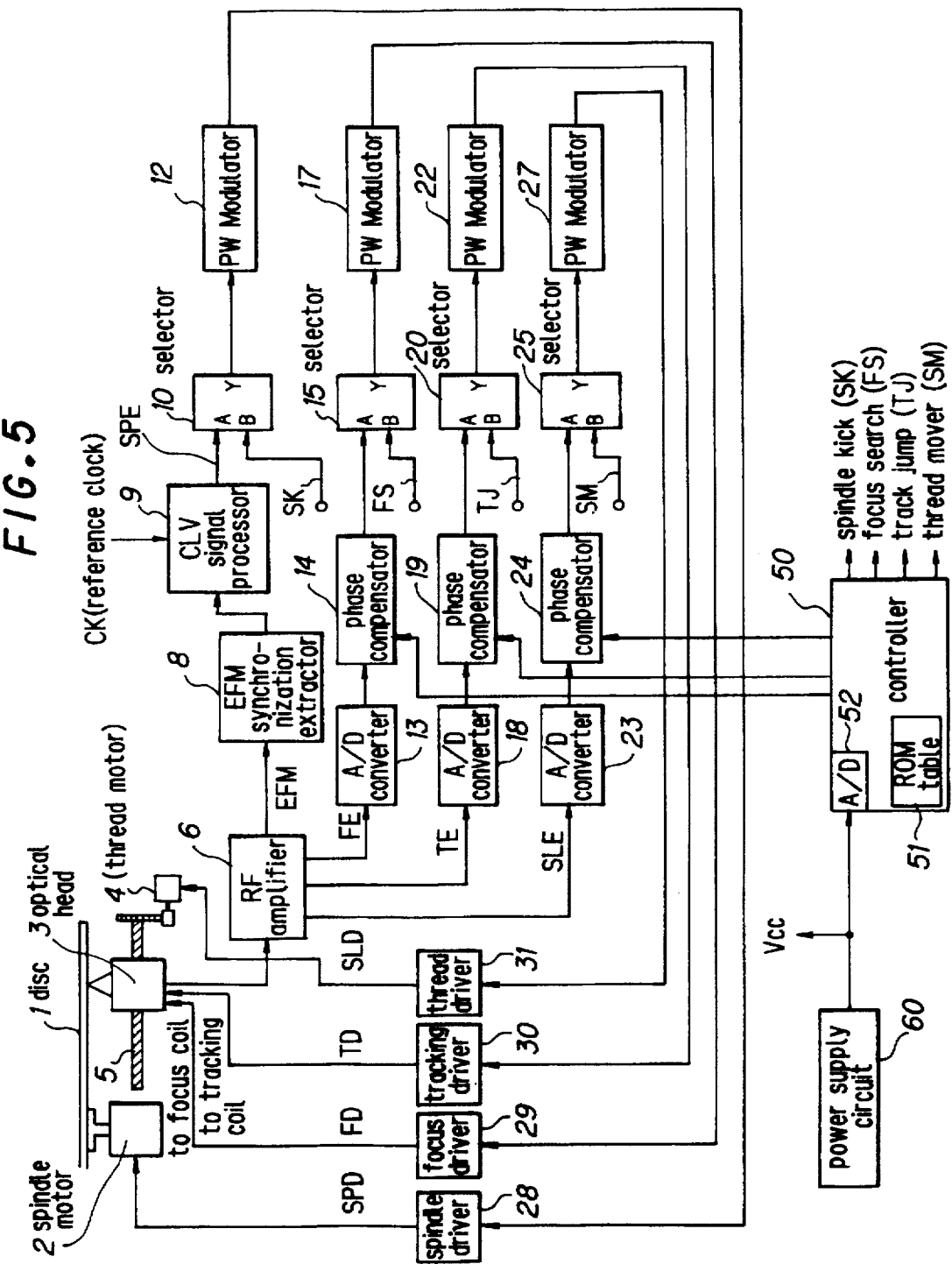
FIG. 5 is a block diagram of a conventional servo apparatus.

The servo apparatus .in the case of installation in an MD player is almost the same as with respect to the servo apparatus in the kind of CD player shown in FIG. 5. There is, however, a slight difference in the circuit structure which is crucial with respect to the present invention and these parts will therefore be described first.

In the case of, for example, a mini-disc system, the disc 1 may be a pre-recorded disc (optical disc/magneto-optical disc) with a structure consisting entirely of pit information exclusively for playback or a recording/playback disc (magneto-optical disc) on which TOC information is formed using pits and on which music or user TOC's may be recorded. There are also magneto-optical discs which are hybrid discs which have both tracks using pits and tracks using magneto-optics as audio data tracks for music etc.

When the optical head 3 is reading out data from the magneto-optical disc, (or the magneto-optical region of the disc) data is detected from the reflected light beam using the magnetic Kerr effect. Data for the RF playback signal is then read in response to changes in the level of the light beam reflected back, which depends on whether or not pits are present in the case of optical discs where pits are recorded in the same way as for CD's.

Figure 6:
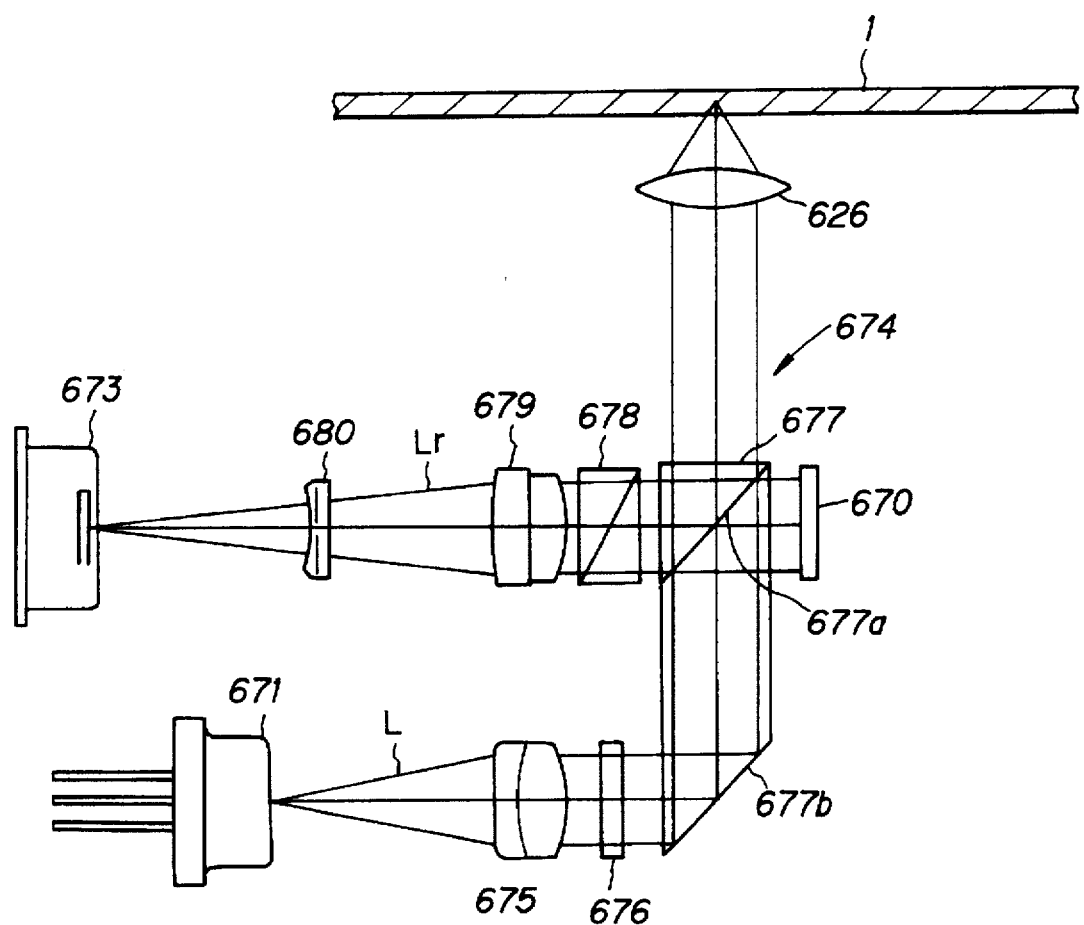
FIG. 6 is a diagram illustrating optical head 3.

FIG. 6 shows an optical head 3. The optical head 3 has an optical system 674 which includes a light source 671 which emits a light beam L, an objective lens 626 for converging the light beam L on the disc 1 and a photodetector 673 for detecting the return light beam Lr which is reflected from the disc 1. Photodetector 673 acts to convert the return light beam Lr into an electrical signal (detection signal) which is proportional to the intensity of the reflected light beam Lr. The optical head 3 may be constructed as a unit adapted for being moved along the radius of the disc 1.

The optical system 674 also includes a collimator lens 675, a diffraction grating 676, a beam splitter 677 and a Wollaston prism 678. The collimator lens 675 converts the light beam L radiated from the laser light source 671 into a collimated light. The diffraction grating 676 divides the light beam L into at least three light beams. The beam splitter 677 splits the light beam L from the laser light source 671 from the return light beam Lr. The prism 678 is arranged on a light path of the return light beam Lr between the beam splitter 677 and the photodetector 673 for splitting the return light beam Lr from the laser light source 671 towards a boundary plane 677a.

A converging lens 679 for converging the return light beam Lr on the photodetector 673 and a multi-lens 680 made up of a cylindrical lens and a concave lens for adjusting the focal distance of the return light beam Lr and for generating astigmatism are arranged between the Wollaston prism 678 and the photodetector 673.

A light receiving element 670 has a photodetector for detecting a part of the light beam L from the laser light source 671, that is the light component reflected at the boundary plane 677a of the beam splitter 677, for translating the detected light into an electrical detection signal of an output current or voltage level corresponding to the volume of the reflected light beam, is provided on the side of the beam splitter 677 opposite to the photodetector 673.

A detection signal from the light receiving element 670 is supplied to an automatic power controlling circuit, not shown. The automatic power controlling circuit controls the output of the laser light source 671 based on the detection signal from the light receiving element 670 so that the light intensity of the light beam L from the laser light source 671 will be constant.

The operation of the optical head 3 is explained. The light beam L radiated from the laser light source 671 is collimated by the collimator lens 675 before being incident on the diffraction grating 676. The light beam L is divided by the diffraction grating 676 into at least three light beams, that is the 0th order light, +1st order light and the −1st order light. These light beams are transmitted through the boundary plane 677a of the beam splitter 677 so as to be supplied to the objective lens 626.

The objective lens 626 converges and radiates the three light beams divided from the light beam L. Of these three light beams, the center one (0th order light) is radiated on the center of a recording track on the disc 1, while the remaining two light beams (±1st order lights) are radiated on the guide groove as to lie ahead and at back of the center light beam.

In the case of a pre-recorded optical disc, the light beam L radiated on the center of the recording track is modulated in accordance with phase pits formed along the recording track of disc 1. If the disc 1 is a magneto-optical disc, the light beam L radiated on the center of the recording track has its plane of polarization rotated in accordance with the pattern of magnetization of the recording layer on the recording track. On the other hand, the light beam L radiated on the guide groove is modulated in accordance with the edges of the guide groove for both the pre-recorded type optical disc and the magneto-optical recordable disc.

The three return light beams Lr reflected by the disc 1 are incident via the objective lens 626 on the beam splitter 677 so as to be reflected by its boundary plane 677a. The three return light beams Lr are incident on the downstream side Wollaston prism 678.

The Wollaston prism 678 splits each of the three return light beams Lr incident thereon in a direction intersecting the splitting direction by the diffraction grating 676. In this manner a sum of nine return light beams Lr are radiated from the Wollaston prism 678. These nine return light beams Lr are converged by a next-stage, the converging lens 679, and caused to be incident on the photodetector 673 via the multi-lens 680. The nine return light beams Lr are caused to be incident on the photodetector 673 in a state in which beam spots on the photodetector 673 are arrayed in a square pattern. A further description of a Wollaston prism as incorporated herein is disclosed in U.S. Pat. No. 4,771,414 to Hiroshi Yoshimatsu et. al.. U.S. Pat. No. 4,771,414 is hereby incorporated herein by reference.

Figure 7:
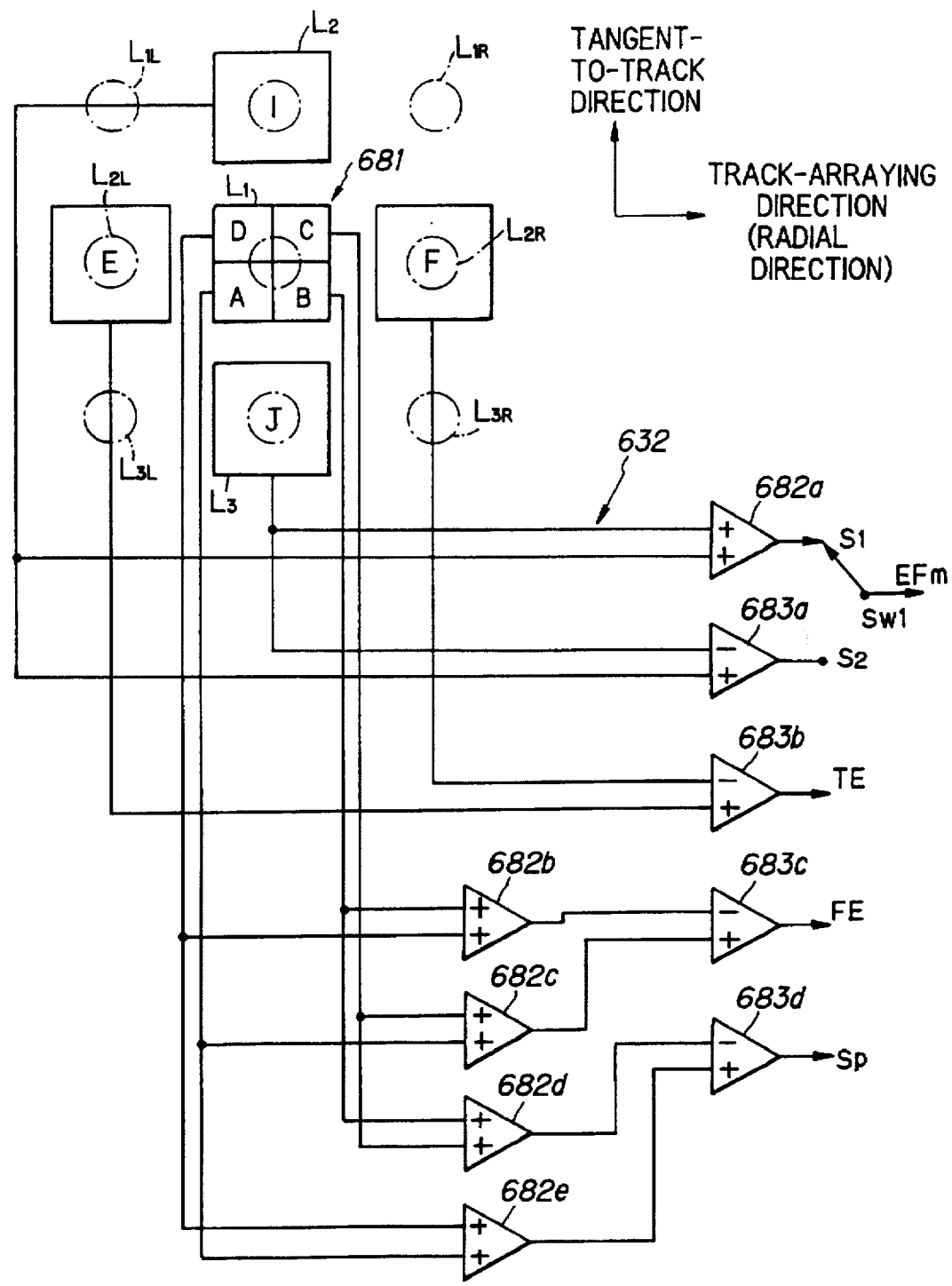
FIG. 7 is a diagram illustrating photodetector 673.

An illustration of photodetector 673 is shown in FIG. 7. Photodetector 673 includes an array of light receiving detectors, each consisting in a PN junction, on a single semiconductor substrate. The photodetector 673 has a central four-segment detector 681 which is made up of four light receiving elements A, B, C and D each having a small light-receiving area, arrayed in a square pattern. The light-receiving elements I and J are arrayed above and below the four-segment detector 681 as shown in FIG. 7. Third and fourth light-receiving elements E and F are arrayed on the left and right sides of the four segment detector 681. These light-receiving elements are separated from one another by a field insulating film prepared selective oxidation (LOCOS) method by an element separating zone by a trench construction. The substrate on which these light-receiving elements are arrayed is arranged so as to be perpendicular with respect to an optical axis of the return light beam Lr.

As for the disposition of these light-receiving elements with respect to the track-arraying direction (radial direction) of disc 1 and the direction tangential to the track, the central four-segment detector 681 is arranged substantially at the track center, while the first and second light-receiving elements I and J are arrayed along the tangent to the track and the third and fourth light-receiving elements E and F are arrayed along the track-arraying direction.

Of the nine return light beams Lr, the center return light beam L1 is received by the four-segment detector 681. The return light beam L2, which is split by the first light receiving element I, and which is composed of an S-polarized light component, is received by the second light receiving element J. Of the three return light beams L1L, L2L, L3L, disposed on the left side of the centrally disposed three return light beams L1 to L3, the centrally disposed return light beam L2L is received by the third light receiving element E. On the other hand, of the three return light beams L1R, L2R and L3R, disposed on the left side of the centrally disposed three return light beams L1 to L3, the centrally disposed return light beam L2R is received by the fourth light-receiving element F.

The detection signals from the four-segment detector 681, first and second light receiving elements I and J and the third and fourth light receiving elements E and F are supplied to the processing circuit 632 made up of a plurality of, herein five, addition circuits 682a to 682e, and a plurality of, herein four, subtractive circuits 683a–683d. These addition circuits, 682a–682e, and subtractive circuits 683a–683d are incorporated into RF amplifier 6.

The detection signals from the first and second light receiving elements I, J are supplied to the first additive circuit 682a. The detection signals from the light receiving elements B, D of the four-segment detector 681 are supplied to the second additive circuit 682b, while detection signals from the light receiving elements A, C of the four-segment detector 681 are supplied to the third additive circuit 682c. The detection signals from the light receiving elements B, C are supplied to the fourth additive circuit 682d. The detection signals from the light receiving elements A, D of the four segment detector 681 are supplied to the fifth additive circuit. Signal lines from the respective light receiving elements are connected in this manner to the respective light receiving elements.

The detection signals from the first and second light receiving elements I and J are supplied to the first subtractive circuit 683a. The detection signals from the third and fourth light-receiving elements E and F are supplied to the second subtractive circuit 683b. The addition signals from the second and third additive circuits 682b and 682c are supplied to the second subtractive circuit 683c. The addition signals from the fourth and fifth additive circuits are inputted to the fourth subtractive circuit 683d. Signal lines from the respective light receiving elements are connected in this manner to the respective subtractive elements.

The output signals of the first additive circuit 682a and the first to fourth subtractive circuits 683a to 683d are related with one another by the following equations:

$$S1=I+J$$

$$S2=I-J$$

$$TE=E-F$$

$$FE=(A+C)-(B+D)$$

$$SP=(A+D)-(B+C)$$

More particularly, the output signal of the first additive circuit 682a becomes a first readout signal S1, the output signal of the first subtractive circuit 683a becomes a second readout signal S2, the output signal of the second subtractive circuit 683b becomes a tracking error signal TE, the output signal of the third subtractive circuit 683c becomes a focusing error signal FE and the output signal of the fourth subtractive circuit 683d becomes a push-pull signal Sp.

Signal S1 and Signal S2 are alternately output to EFM synchronization extractor 8 as signal EFM, via a switch SW1. The switch SW1 is controlled via controller 50. Where disc 1 is a pre-recorded disc such as a CD or MD, signal S1 is output as EFM. Where disc 1 is a recordable MO type disc, signal S2 is output via switch SW1 as signal EFM, and groove data signal Sp is output to A/D convertor 23 as signal SLE.

It should be noted that in the present embodiment, the multi-lens 680 is arrayed between the converging lens 679 and the photodetector 673 and, as the objective lens 626 is deflected towards the direction perpendicular to the in-plane direction of the disc 1, the spot radiated on the light-receiving area of each of the light receiving elements A to D of the four segment detector 681 is changed in profile. As a result thereof, the focusing error signal FE may be produced accurately.

At the optical head 3, a photodetector 673 for detecting a light beam from the light source 671 which is reflected from the disc 1 has a four partition detector (A, B, C, D), a sidespot detector (E, F) and an RF detector (I, J). At the RF amplifier 6, an RF playback signal (EMF signal) to be taken as the pit information is obtained using the operation (I+J) and an RF playback signal (EMF signal) to be taken as the magneto-optical information is calculated using the operation I−J. A tracking error signal TE is also generated using the operation (E−F) along with a focus error signal(FE) generated by carrying out the operation (A+C)−(B+D). The tracking error signal TE is used to generate a thread error signal SLE. The thread error signal SLE is generated by extracting a d.c. component from the tracking error signal TE.

Further, groove information signal Sp is extracted from a push-pull signal obtained by the operation (A+D)-(B+C).

When the magneto-optically recorded information is being played back, the RF amplifier sends the groove information signal (A+D)−(B+C) to the address decoder 7. The address decoder 7 detects the absolute address of the disc playback position from the groove information, with this groove information Sp also being used to generate a spindle servo error signal SPE.

When the optical head 3 is then scanning the magneto-optical recording region of the disc 1 during playback, in addition to demodulating the address from the groove information, bi-phase data is also extracted at the address decoder 7 using phase locked loop (PLL) demodulation after the groove information has been put into binary form. In the address decoder 7, a playback clock of a prescribed frequency is then taken from this bi-phase data using PLL processing, with this bit clock then being sent to the CLV signal processor 9 as the spindle rotational speed information Spp.

A spindle error signal SPE is then generated at the CLV signal processor 9 by comparing the bit clock extracted from the address decoder 7 with a reference address clock.

While the optical head 3 is scanning the pit recording region of the disc 1 during playback, the RF amplifier 6 generates an RF playback signal (EMF) to be taken as pit information using the operation (I+J) and synchronization detection is then carried out at the EMF synchronization detector 8. The EMF synchronization signal is then output to the PLL circuit at the CLV signal processor 9 so that a playback bit clock is obtained. This is then compared with a standard reference clock CK and a spindle error signal SPE is generated.

The explanation of aspects other than those described above shall be omitted as these aspects are basically the same as those described for the servo apparatus built into the CD player described in FIG. 5.

This embodiment is characterized by multipliers 11, 16, 21 and 26 arranged between the selectors (10, 15, 20, 25) and the PW modulators (12, 17, 22, 27) in each of the spindle, focus, tracking and thread servo systems.

Multiplication processing is carried out with each of the multipliers 11, 16, 21 and 26 sharing a common multiplication coefficient K from the controller 50.

This coefficient K is then provided from the controller 50 in such a manner that the gain of the multipliers 11, 16, 21 and 26 can be varied within a range of, for example, about 6 dB.

The controller 50 monitors the power supply voltage Vcc via the A/D converter 52 and coefficients corresponding to power supply voltage values are stored in the ROM table 51. The coefficient K is output, for example, as K=1 when the voltage value is appropriate or meets a predetermined voltage level, such as a maximum or optimum voltage level. Prescribed values for the coefficient K are then read out from the ROM table 51 in response to the extent of any fluctuations of the power supply voltage value from the appropriate voltage value.

The servo gain is adjusted for each servo system using a common coefficient for the multipliers 11, 16, 21 and 26 so that the extent of fluctuation of the servo driving force with respect to fluctuations in the power supply voltage Vcc is the same for each servo system. Each of the servo operations therefore remain stable even if the power supply voltage changes. It follows that with, for example, battery driven MD players, an appropriate servo operation can be carried out as usual even if the voltage Vcc for the common power supply gradually decreases.

By controlling these multipliers 11, 16, 21 and 26 together, the amount of data which has to be stored in the ROM table 51 can be reduced. The processing load placed on the controller 50 is also reduced as the four servo systems do not have to be controlled individually.

Also, as the multipliers 11, 16, 21 and 26 are arranged so as to follow the selectors 10, 15, 20 and 25, the gain occurring at the time of each of the focus search, track jump, thread move and spindle kick operations is also adjusted so as to correspond to the power supply voltage. It is therefore no longer necessary to adjust each value while the controller 50 is outputting the focus search control signal FS, the track jump control signal TJ, the thread move control signal SM and the spindle kick control signal SK.

Further, it follows that items such as saturation and the maintenance of bit precision at the signal processing steps within the phase compensation circuits no longer have to be taken into consideration as the gain adjustment is not carried out at the phase compensators (14, 19, 24). This has the benefit that the gain adjustment is possible by, for example, employing a simple multiplication operation using a four-bit precision multiplier to carry out bit shift processing.

Figure 2:
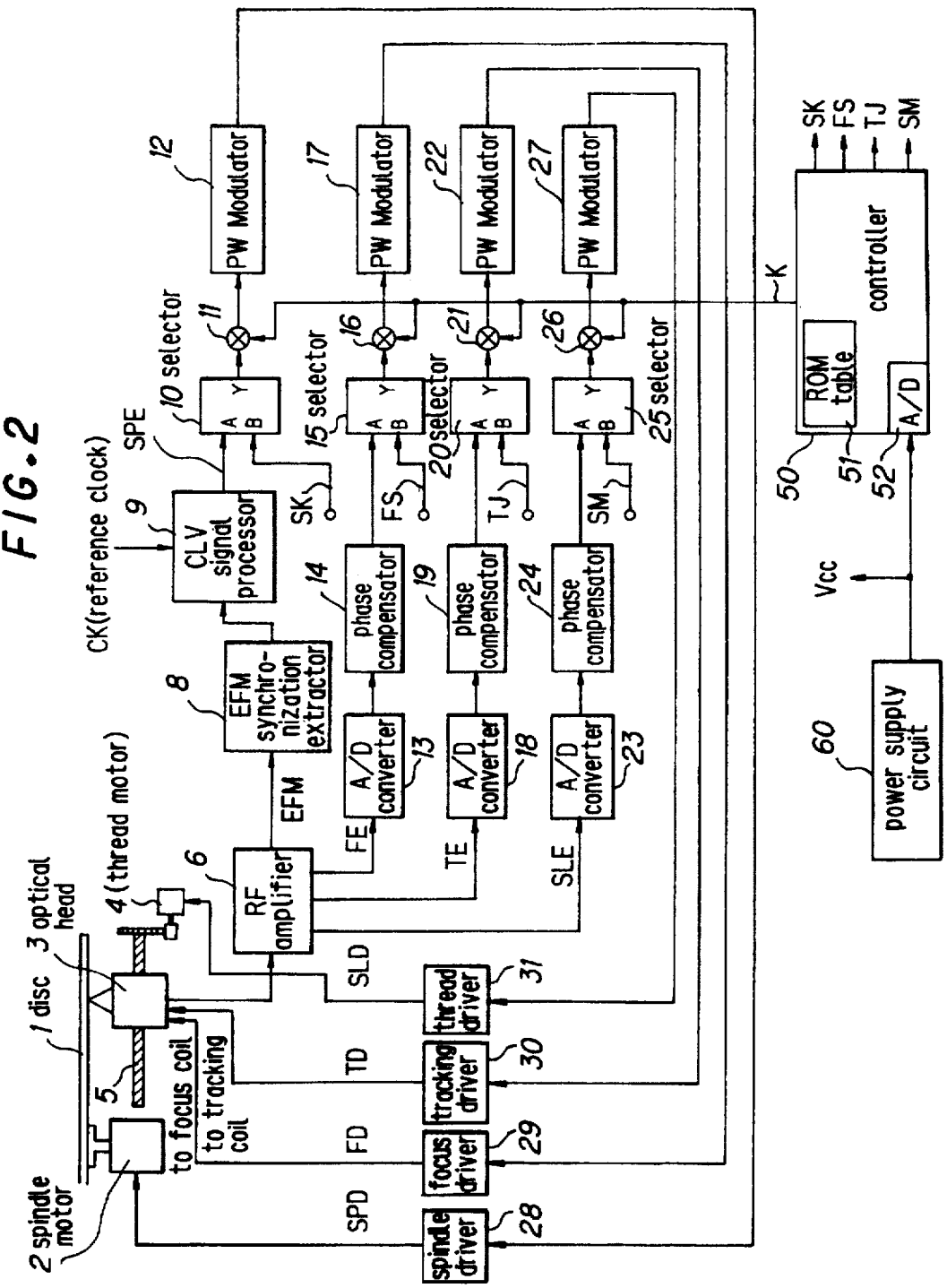
FIG. 2 is a block diagram of a servo apparatus for a second embodiment of this invention.

FIG. 2 is a view of a second embodiment of this invention. In this case, a servo apparatus is employed in a CD player.

Here, in addition to the circuit structure in FIG. 5, multipliers 11, 16, 21 and 26 are arranged between the selectors (10, 15, 20, 25) and the PW modulators (12, 17, 22, 27) in the same way as for the first embodiment.

This embodiment also has the same effects as the first embodiment.

Figure 3:
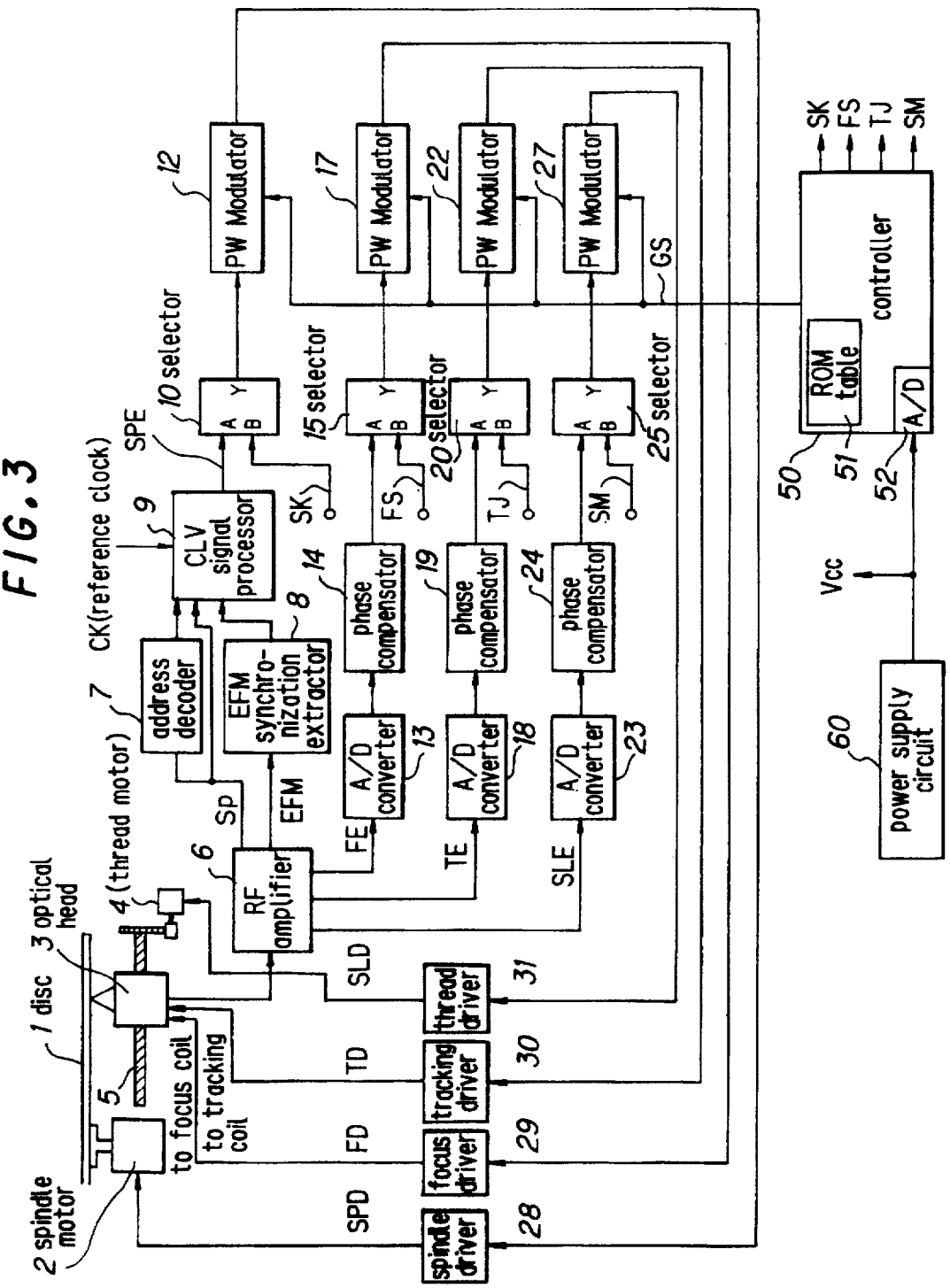
FIG. 3 is a block diagram of a servo apparatus for a third embodiment of this invention.

FIG. 3 shows a third embodiment of this invention. This is a circuit structure set up for an MD player in the same way as that in the first embodiment, but rather than setting up multipliers 11, 16, 21 and 26, the controller 50 supplies a gain control signal GS to the PW modulators 12, 17, 22 and 27.

The PW modulators 12, 17, 22 and 27 operate a counter in response to input data from the selectors 10, 15, 20 and 25. If the counter clock frequency is changed while the pulse width is set up using the counter output and a PWM signal is generated, the PWM signal pulse width will also change. The servo gain can therefore be adjusted by adjusting the counter clock frequency.

In this embodiment, the controller 50 reads out the data stored in the ROM table 51 i.e. the counter clock frequency control data, in response to the power supply voltage value. The servo gain is then adjusted with this data being commonly provided to the PW modulators 12, 17, 22 and 27.

This embodiment provides the same results as for the first embodiment.

Figure 4:
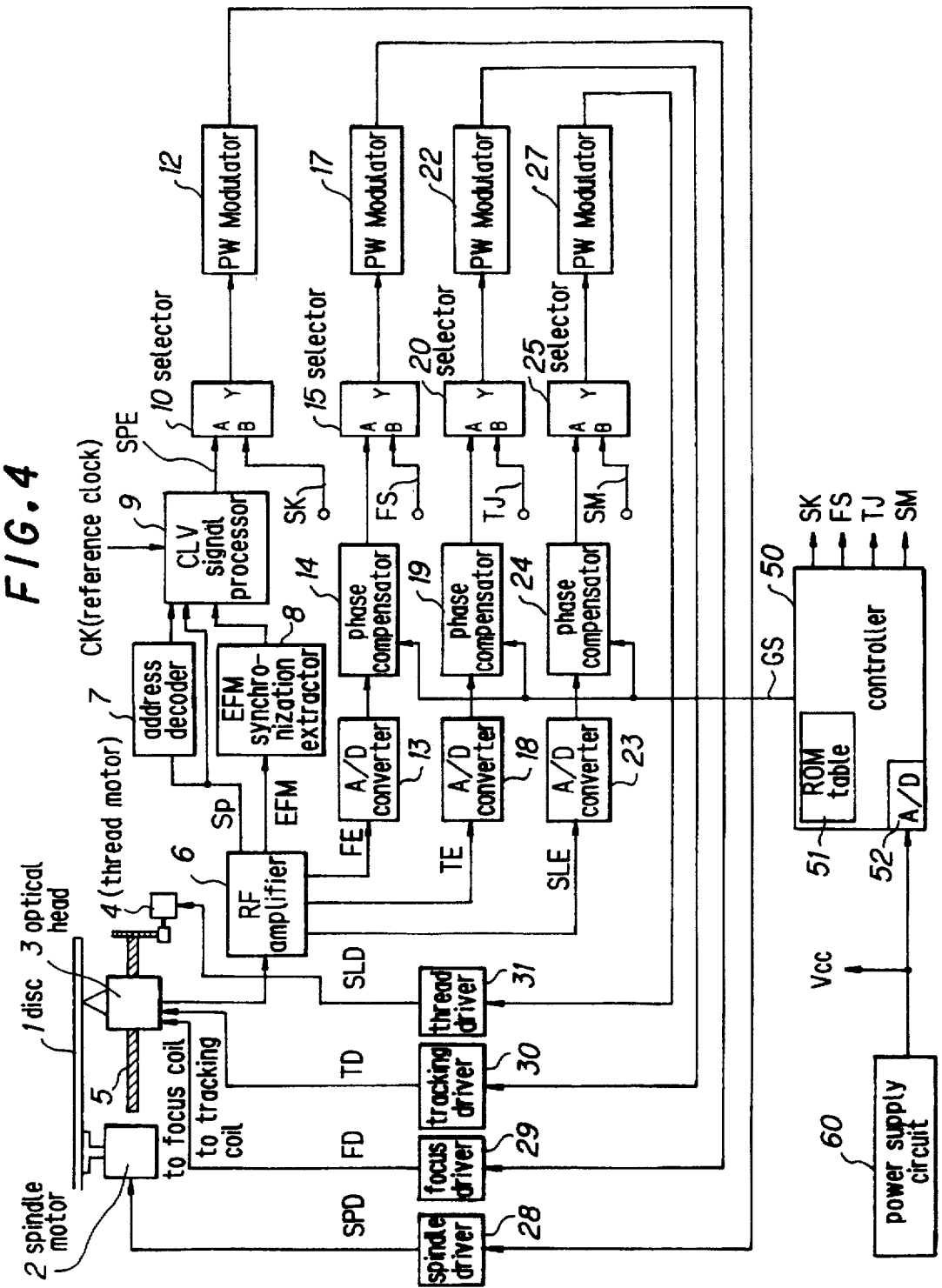
FIG. 4 is a block diagram of a servo apparatus for a fourth embodiment of this invention.

FIG. 4 is a view of a fourth embodiment of this invention. In this embodiment, the controller 50 provides a common gain set up control signal GS to the phase compensators 14, 19 and 24 in response to the power supply voltage.

In this case, the values for carrying out the gain adjustment in the phase compensators, and the values for the focus search control signal FS, the track jump control signal TJ, the thread move control signal SM and the spindle kick control signal SK are adjusted by operations within the controller 50. Although this approach has disadvantages when compared to embodiments 1 to 3, the use of common control of the phase compensation circuits 14, 19 and 24 means that the processing load can be reduced and the amount of data in the ROM table 51 can be reduced when comparisons are made with the conventional example in FIG. 5.

The present invention is by no means limited to the aforementioned embodiments and various structures may be considered.

For example, the kind of gain variation equipment set up in the first, second, third or fourth embodiments may also be employed in a servo apparatus having one system servo system. By the same token, this invention may also be applied by having gain variation equipment set up in the same way within one part of a number of servo systems.

Further, examples have been given for servo apparatus which have been built into MD players and CD players. However, this invention is also suitable for servo apparatus occurring in other disc compatible equipment such as laser disc players and MD recorders etc., as well as tape recording media compatible equipment such as DAT recorder/players, 8 millimeter video tape recorder/players and VTRs etc.

With the servo apparatus for the present invention described above, gain variation equipment is set up so as to proceed the phase compensators, so that the servo gain can be adjusted easily. Also, by setting up the gain variation equipment so as to proceed the selectors, the gain set-up during non-looping operations such as focus searching and track jump operations etc. can be varied by the gain variation equipment. Also, the extent of the variation of the gain controllers can be controlled to be the same with respect to a number of servo systems.

As a result of these items, the processing load on the microcomputer etc. which makes up the controller and the amount of control data required are both reduced. This results in a highly reliable servo apparatus for which the servo operation remains stable even if the power supply voltage fluctuates.

What is claimed is:

1. A servo apparatus comprising:

phase compensation means for carrying out phase compensation on a digital data-dependent servo error signal;

PWM (Pulse width Modulation) means for outputting a PWM signal based on a phase compensation means output;

driver means for outputting a servo drive signal in response to the PWM means output; and gain variation means for varying servo gain in accordance with a power supply voltage, wherein the gain variation means is subsequent to the phase compensation means.

2. A servo apparatus according to claim 1, further comprising selector means for selectively sending the phase compensation means output and a drive control signal to the PWM means, wherein the gain variation means is subsequent to the selector means.

3. A servo apparatus with a plurality of servo systems comprising:

phase compensation means for carrying out phase compensation on a digital data-dependent servo error signal;

PWM (pulse width modulation) means for outputting a PWM signal based on a phase compensation means output;

driver means for outputting a servo drive signal in response to the PWM means output; and gain variation means for varying servo gain in accordance with a power supply voltage, wherein the extent of variation is controlled to be the same for each gain variation means in each servo system.

4. A servo system according to claim 3, wherein the gain variation means proceeds the phase compensation means in each servo system.

5. A servo apparatus according to claim 3, each system further comprising selector means for selectively sending the phase compensation means output and a drive control signal to the PWM means, wherein the gain variation means succeeds the selector means in each system.

6. An optical disc reproducing device comprising:

an optical head for reading data from an optical disc;

a spindle motor for rotating said optical disk;

said spindle motor comprises a rotatable spindle;

an RF amplifier comprising circuitry for generating a servo error signal;

multiplier circuitry for multiplying said servo error signal by a predetermined coefficient and outputting a signal to processing circuitry;

a storage memory for storing coefficient data associated with a predetermined voltage value;

a controller for monitoring power supply voltage and causing said coefficient data stored in said storage memory to be output to said multiplier circuit where said power supply voltage equals said predetermined voltage value; and said processing circuitry generates a drive signal for controlling said spindle motor based upon said signal output from said multiplier circuitry.

7. An optical disk player according to claim 6 wherein said processing circuitry comprises a pulse width modulator and servo driver circuitry.

8. A servo apparatus comprising:

circuitry for generating a servo error signal;

multiplier circuitry for multiplying said servo error signal by a predetermined coefficient and outputting a signal to processing circuitry;

a storage memory for storing coefficient data associated with a predetermined voltage value;

a controller for monitoring a power supply voltage and causing said coefficient data stored in said storage memory to be output to said multiplier circuit where said power supply voltage equals said predetermined voltage value; and said processing circuitry generates a drive signal for controlling said spindle motor based upon said signal output from said multiplier circuitry.

9. A optical disk player comprising:

an optical head for reading data from an optical disc;

a plurality of servo motors each comprising:

a servo motor;

circuitry for generating a servo error signal when said motor operates outside a predefined range of parameters;

multiplier circuitry for multiplying said servo error signal by a predetermined coefficient and outputting a signal to processing circuitry;

a storage memory for storing coefficient data associated with a predetermined voltage value;

a controller for monitoring power supply voltage and causing said coefficient data stored in said storage memory to be output to each of said multiplier circuits where said power supply voltage equals said predetermined voltage value; and said processing circuitry generates a drive signal for controlling said spindle motor based upon said signal output from said multiplier circuitry.

* * * * *